United States Patent [19]
Harris

[11] 3,738,045
[45] June 12, 1973

[54] COMBINATION FISH LURE AND SWIVEL
[76] Inventor: Ewell J. Harris, c/o Sunset Mobile Homes, Route 3, Box 135A, Adrian, Mich.
[22] Filed: June 16, 1971
[21] Appl. No.: 153,528

[52] U.S. Cl............... 43/42.12, 43/42.18, 43/42.53
[51] Int. Cl............................................. A01k 85/04
[58] Field of Search .............. 43/42.12, 42.2, 42.5, 43/42.51, 42.18, 42.19, 42.53

[56] References Cited
UNITED STATES PATENTS

| | | | |
|---|---|---|---|
| 3,439,443 | 4/1969 | Weimer | 43/42.12 |
| 1,822,785 | 9/1931 | Petrie | 43/42.12 |
| 347,122 | 10/1886 | McHarg | 43/42.12 |
| 576,680 | 2/1897 | Kittle | 43/42.12 |
| 839,917 | 1/1907 | Chapman | 43/42.12 |
| 2,236,023 | 3/1941 | Turner | 43/42.12 |
| 2,562,743 | 7/1951 | Schindler et al. | 43/42.12 |

FOREIGN PATENTS OR APPLICATIONS

| | | | |
|---|---|---|---|
| 911,301 | 3/1946 | France | 43/42.19 |
| 936,663 | 2/1948 | France | 43/42.51 |

Primary Examiner—Antonio F. Guida
Assistant Examiner—James H. Czerwonky
Attorney—William P. Hickey

[57] ABSTRACT

A combination fish lure and swivel combined so that a sizable portion of the swivel appears as a fish egg in the open mouth of the lure. The lure comprises a one-piece, plate-like body whose front portion contains a generally V-shaped slot, the wide end of which faces the front end of the body. The front end is bent laterally to one side, the bent portion including the wide end of the slot, with the portion of the body originally contained within the slot now extending from the other side to form an abutment, thus leaving an opening within the body. Pull means extends through the abutment and retains a bead which substantially fills the opening.

1 Claim, 4 Drawing Figures

PATENTED JUN 12 1973 3,738,045
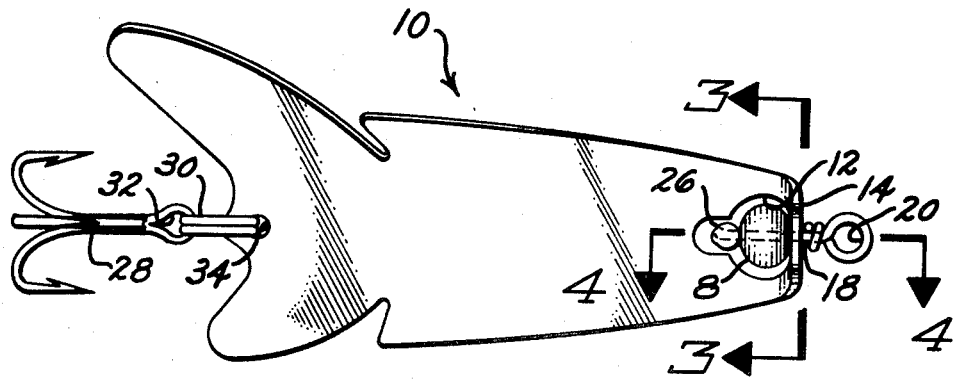
Fig. 1.
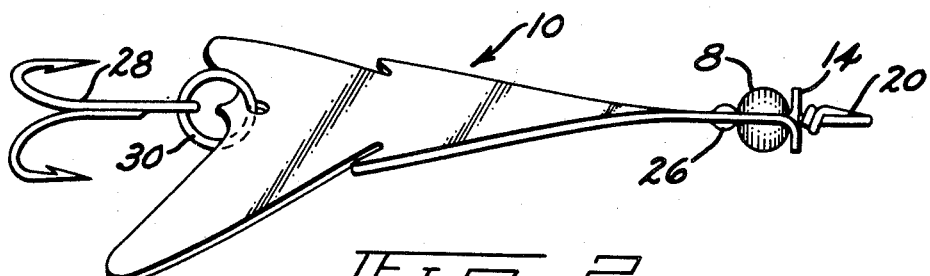
Fig. 2.
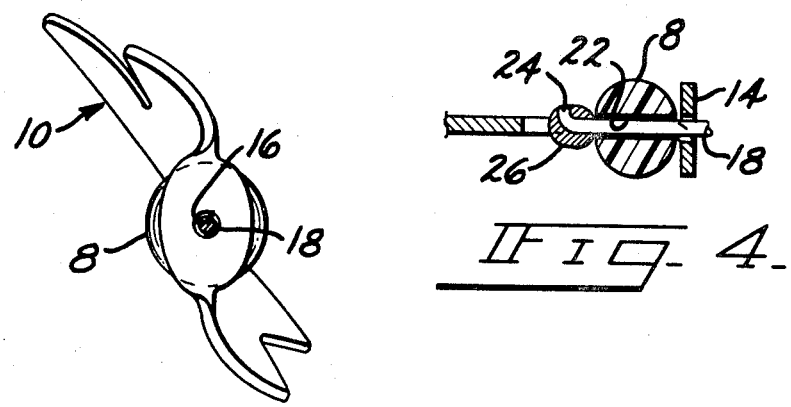
Fig. 3.
Fig. 4.
INVENTOR.
EWELL J. HARRIS
BY
William P. Hickey
ATTORNEY

COMBINATION FISH LURE AND SWIVEL

BACKGROUND OF THE INVENTION

Artificial fish lures are usually used in conjunction with a swivel that is attached to the front of the lure and extends forwardly thereof for an appreciable distance. Fish line that is wound upon a reel and later uncoiled from the reel may in some instances tend to untwist, and when such a line is fastened to a lure, it may cause a undesired rotation of the lure in the water. In other instances, the lure may be designed to rotate in the water and swivel means must be provided to prevent the rotation of the lure from twisting the fish line to which it is attached.

The conventional swivels that are used for the purpose of connecting the fish line and lure in a manner permitting either one or both from rotating relative to the other are long extensive structures which extend an appreciable distance ahead of the lure.

An object of the present invention is the provision of a new and improved combination fish lure and swivel which can be inexpensively produced and which has a more natural appearance to the fish than does a lure preceeded by the conventional swivel structure

BRIEF DESCRIPTION OF THE DRAWINGS

FIG. 1 is a side elevational view of a fish lure embodying principles of the present invention;

FIG. 2 is a plan view of the embodiment of fish lure shown in FIG. 1;

FIG. 3 is an end view of the embodiment shown in FIGS. 1 and 2, taken approximately on the line 3—3 of FIG. 1;

FIG. 4 is a fragmentary sectional view taken approximately on the line 4—4 of FIG. 1.

DESCRIPTION OF THE PREFERRED EMBODIMENT

Conventional swivels extend forwardly from the lure by a appreciable distance and present an unnatural appearance to the fish which detracts from its alluring nature, or even scares or warns the fish of impending danger. According to the invention, the swivel portion of the invention comprises a round bead 8 having a hole therethrough, and which is usually brightly colored, as for example orange, pink or red. This bead 8 is positioned in the front portion of the lure which front portion is arranged to simulate the mouth of a fish or other marine creature. The bead is positioned in the simulated mouth, so that it appears that the lure is after or has a fish egg, and particularly a salmon egg in its mouth. The lure 10 can be of any suitable type as for example a plug, spinner, spoon etc., and has particular advantages when it is combined with a lure which revolves as it passes through the water. The lure 10 shown in the drawing is a thin metal, one-piece sheet that is contoured to give the appearance, at least from the side, of a swimming fish. The lure might be bent so that it wobbles from side to side to simulate a swimming fish rather than rotate. Regardless of the configuration of the main portion, however, the front of the lure has an opening that is shaped to simulate the open mouth of the fish. Such openings will usually be wide at the front, and will narrow at the rear, so that the opening 12 has the general appearance of a horizontal triangle. An abutment 14 is provided at the front of the mouth 12 and has a longitudinal hole 16 therethrough to receive the pull means 18 for the lure. In the embodiment shown, the pull means 18 is a thin wire the front end of which is coiled into a loop 20, and the rear portion of which extends through the opening 16 and through an opening 22 in the bead 8. The back end of the wire 18 is turned laterally at 24 as to provide securing means for a bead or drop of epoxy resin 26 which prevents the withdrawal of the wire 18 from the bead 8. Any suitable means can be used to prevent the withdrawal of the wire 18, and in some instances the bead 26 can be solder or other metal. Alternatively, a washer or deformed portion of the wire 18 can be used in place of the bear 26.

The abutment 14 can be of any suitable construction but is preferably made to appear as top and bottom lips or beaks as is natural in some kinds of fish. In the embodiment shown in the drawing, the abutment 14 is inexpensively produced by bending a portion of the sheet material that is forwardly of the mouth 12 at right angles to the body of the lure. In addition the mouth 12 is formed by shearing a generally V-shaped slot through the sheet material with the wide portion of the bead directly behind the abutment 14, so that the V-shaped material so sheared can also be bent laterally, By shearing the V-shaped slot before the front portion of the sheet material is bent laterally, a single bending operation will bend the front portion of the sheet material in one lateral direction and swing the rear sheared portion in the opposite lateral direction. The opening 16 is preferably made in the sheet material before the front portion of the sheet material is bent laterally, and the opening 16 may be made either before or after the shearing operation which forms the outline of the mouth. The general outline of the lure can also be stamped at the same time that the opening 12 is sheared. The lure 10 of course will have the usual hook 28 fixed to the rear portion thereof, and this can be simply done by passing a ring 30 through the usual loop 32 in the front of the hook 28 and through an opening 34 in the rear of the lure 10. The opening 34 can be made at the same time that the opening 16 is produced.

It will now be seen that the present invention provides a lure and swivel with the appearance of a marine creature swallowing an egg, and particularly a salmon egg. This appearance is presented to fish on either side of the lure, and because the lure rotates slowly, the appearance will also be presented to fish that are below and above the lure. Fish so attracted will usually let the lure pass without making menacing motions toward the lure, and will thereafter try to overtake the lure from behind. From behind, the top portion of the lure has the appearance of a fin, and the lateral twist of the lower portion gives the appearance of a body.

While the invention has been described in considerable detail, I do not wish to be limited to the particular embodiment shown and described, and it is my intention to cover hereby all novel adaptations, modifications and arrangements thereof which come within the practice of those skilled in the art to which the invention relates.

I claim:

1. A fish lure comprising: a flat thin one-piece plate-like body member having front and rear ends, said front end of said plate-like body member having a substantially axially aligned generally V-shaped slot formed internally therein with the wide end of the slot being adjacent the front and of the body, and with the portion of said body member located within the confines of said slot forming a generally V-shaped abutment portion, said front end of said plate-like body member being bent laterally to one side of said plate member, said wide end of said slot extending into said laterally bent portion, said generally V-shaped abutment portion extending in the opposite direction from said laterally bent portion to form a similarly configured, generally V-shaped fish mouth opening in said body member, said V-shaped abutment portion having a hole therethrough communicating with said V-shaped fish mouth opening, a bead having exterior dimensions substantially equal to the interior dimensions of said opening, thereby substantially filling said fish mouth opening, and pull means extending through said hole in said abutment portion and secured to said bead.

* * * * *